US008344051B2

(12) United States Patent
Eckel et al.

(10) Patent No.: US 8,344,051 B2
(45) Date of Patent: Jan. 1, 2013

(54) FLAMEPROOFED, IMPACT-MODIFIED, SCRATCH-RESISTANT POLYCARBONATE MOULDING COMPOSITIONS WITH GOOD MECHANICAL PROPERTIES

(75) Inventors: Thomas Eckel, Dormagen (DE); Vera Taschner, Köln (DE); Achim Feldermann, Düsseldorf (DE); Burkhard Thuermer, Bornheim (DE); Dieter Wittmann, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/969,940

(22) Filed: Dec. 16, 2010

(65) Prior Publication Data

US 2011/0152416 A1 Jun. 23, 2011

(30) Foreign Application Priority Data

Dec. 18, 2009 (DE) .................... 10 2009 059 075

(51) Int. Cl.
*C08K 5/523* (2006.01)
*C08K 3/34* (2006.01)

(52) U.S. Cl. ...................... 524/127; 524/447
(58) Field of Classification Search ............ 524/127, 524/447
See application file for complete search history.

(56) References Cited

U.S. PATENT DOCUMENTS

| 4,357,271 | A | 11/1982 | Rosenquist |
| 4,478,964 | A | 10/1984 | Carter, Jr. |
| 5,153,251 | A | 10/1992 | Lupinski et al. |
| 2007/0072960 | A1 | 3/2007 | Ma et al. |
| 2008/0132618 | A1 | 6/2008 | Eckel et al. |

FOREIGN PATENT DOCUMENTS

| EP | 0066772 | 12/1982 |
| EP | 0525955 | 2/1993 |
| EP | 0707978 | 4/1996 |
| EP | 0758003 | 2/1997 |
| WO | 8202398 | 7/1982 |
| WO | 03082965 | 3/2003 |

OTHER PUBLICATIONS

International Search Report of PCT/EP2010/069834 Mailed Mar. 31, 2011.
Written Opinion of PCT/EP2010/069834.

*Primary Examiner* — Peter Szekely
(74) *Attorney, Agent, or Firm* — Baker Donelson Bearman Caldwell & Berkowitz PC

(57) ABSTRACT

The present invention relates to flameproofed, impact-modified, scratch-resistant polycarbonate (PC) compositions and molding compositions with surface-modified, calcined kaolin as filler, which have good mechanical properties, good flowability and high chemical resistance. Furthermore, the present application relates to the use of the compositions for the production of moldings.

19 Claims, No Drawings

FLAMEPROOFED, IMPACT-MODIFIED, SCRATCH-RESISTANT POLYCARBONATE MOULDING COMPOSITIONS WITH GOOD MECHANICAL PROPERTIES

CROSS REFERENCE TO RELATED APPLICATIONS

This application claims priority to 10 2009 059075.7 filed Dec. 18, 2009, the content of which is incorporated herein by reference in its entirety.

BACKGROUND OF THE INVENTION

1. Field of the Invention

The present invention relates to flameproofed, impact-modified, scratch-resistant polycarbonate (PC) compositions and moulding compositions with surface-modified, calcined kaolin as filler, which have good mechanical properties, good flowability and high chemical resistance, a process for the production thereof and their use for the production of mouldings.

2. Description of Related Art

US 2007/0072960 A1 describes flameproofed thermoplastic compositions containing polycarbonate, a polycarbonate-polysiloxane copolymer (SiCoPC) and a filler silanised by surface treatment (e.g. talc, clay, wollastonite, silica, glass, quartz or mica treated with vinyl silane), which can additionally contain an impact modifier.

In EP 758003 A2, polycarbonate compositions are described with improved surface properties and a high modulus, which contain an inorganic filler and phosphoric acid ester as flame retardant. Glass fibres, carbon fibres, talc, clay or mica are mentioned as inorganic fillers; calcined kaolin and the addition of an impact modifier, on the other hand, are not described.

WO 2003082965 discloses flameproofed polymer compositions containing a polymer and a particulate clay mineral, wherein the particle count is at least 1 per 100 cubic micrometres and the clay mineral is not organomontmorillonite. Kaolin, partially calcined and fully calcined kaolin are specifically claimed. In contrast to the present invention, however, surface-modified calcined kaolins are not described.

EP 525955 A1 describes flameproofed polymer compositions comprising a polycarbonate blend or polyester carbonate blend and a filler treated with liquid polydiorganosiloxane (e.g. calcined kaolin). In EP 525955 A1, neither phosphorus-containing flame retardants nor impact modifiers are described.

EP 707978 A1 describes a recording material which contains, inter alia, a protective layer with optionally surface-modified calcined clay dispersed in a binder (PC) on a support. However, the compositions are neither impact-modified nor flameproofed.

From WO 1982002398 A1, thermoplastic polycarbonate compositions are known which contain a silane-modified filler, e.g. a kaolin. As in EP 707978 A1, however, neither impact-modified nor flameproofed compositions are described.

EP 66772 A2 describes a polycarbonate composition consisting of an aromatic thermoplastic PC and 0.025-5 parts by weight of a silicate with an average particle size of 0.05-20 micrometres. The addition of impact modifiers and flame retardants, on the other hand, is not described.

SUMMARY OF THE INVENTION

An object of the present invention is to provide a moulding composition which is distinguished by a good property combination of very good mechanical properties under rapid impact stress, such as high impact resistance, high modulus of elasticity and elongation at break, and by good chemical resistance (ESC properties) with good scratch resistance. The moulding compositions should preferably be flame-resistant and meet the requirements of UL94 with V-0, even for low wall thicknesses (i.e. wall thickness of as low as about 1.5 mm or even lower), and have a good melt viscosity.

Surprisingly, it has been found that compositions comprising

A) 10-90 parts by weight, preferably 50-85 parts by weight, particularly preferably 60-75 parts by weight, aromatic polycarbonate and/or aromatic polyester carbonate, B) 0.5-30.0 parts by weight, preferably 1.0-25.0 parts by weight, more preferably 2.0-20.0 parts by weight, particularly preferably 4.0-9.0 parts by weight, rubber-modified graft polymer, C) 0.5-20.0 parts by weight, preferably 1.0-18.0 parts by weight, more preferably 2.0-16.0 parts by weight, particularly preferably 3.0-15.5 parts by weight, of at least one phosphorus-containing flame retardant, D) 0.1-25.0 parts by weight, preferably 1.0-20.0 parts by weight, more preferably 5.0-15.0 parts by weight, even more preferably 7.0-13.0 parts by weight and particularly preferably 8.0 to 12.0 parts by weight, surface-treated, calcined kaolin, E) 0-10.0 parts by weight, preferably 0.5-8.0 parts by weight, particularly preferably 1.0-6.0 parts by weight, additives, F) 0-40.0 parts by weight, preferably 1.0-30.0 parts by weight, particularly preferably 1.5-10.0 parts by weight, vinyl (co)polymer, wherein all data relating to parts by weight in the present application are standardised such that the sum of the parts by weight of all components A+B+C+D+E+F in the composition adds up to 100, and these compositions advantageously exhibit the desired property profile.

The present invention also provides processes for the production of the moulding compositions and the use of the moulding compositions for the production of mouldings.

DETAILED DESCRIPTION OF A PREFERRED EMBODIMENT

The moulding compositions according to the invention can be used, for example, for the production of all types of mouldings. These can be produced by injection moulding, extrusion and blow moulding processes. Another form of processing is the production of mouldings by thermoforming from previously produced sheets or films.

Examples of these mouldings include films, profiles, all types of housing parts, e.g. for domestic appliances such as juice presses, coffee machines, mixers; for office equipment such as monitors, flat screens, notebooks, printers, copiers; sheets, pipes, electrical installation ducts, windows, doors and other profiles for the construction sector (interior fittings and exterior applications) as well as electrical and electronic parts such as switches, plugs and sockets as well as body and interior components for commercial vehicles, especially for the automotive sector.

In particular, the moulding compositions according to the invention can also be used for example for the production of the following mouldings or moulded parts: interior fittings for rail vehicles, ships, aircraft, buses and other motor vehicles, housings for electrical equipment containing small transformers, housings for equipment for information processing and transfer, housings and claddings for medical equipment, massage equipment and housings therefor, toy vehicles for children, flat wall panels, housings for safety devices, thermally insulated transport containers, mouldings for sanitary ware and bathroom fittings, covering grid plates for ventilation openings and housings for garden equipment.

Component A

Aromatic polycarbonates and/or aromatic polyester carbonates according to component A which are suitable according to the invention are known from the literature or can be produced by processes known from the literature (for the production of aromatic polycarbonates, see for example Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the production of aromatic polyester carbonates, e.g. DE-A 3 007 934).

The production of aromatic polycarbonates takes place e.g. by reacting diphenols with carbonic acid halides, preferably phosgene, and/or with aromatic dicarboxylic acid dihalides, preferably benzene dicarboxylic acid dihalides, by the interfacial polycondensation process, optionally with the use of chain terminators, e.g. monophenols, and optionally with the use of trifunctional or more than trifunctional branching agents, e.g. triphenols or tetraphenols. Production is also possible by a melt polymerisation process by reacting diphenols with e.g. diphenyl carbonate.

Diphenols for the production of the aromatic polycarbonates and/or aromatic polyester carbonates are preferably those of formula (I)

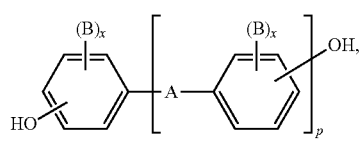

(I)

wherein
A is a single bond, $C_1$ to $C_5$ alkylene, $C_2$ to $C_5$ alkylidene, $C_5$ to $C_6$ cycloalkylidene, —O—, —SO—, —CO—, —S—, —SO$_2$—, $C_6$ to $C_{12}$ arylene, on to which other aromatic rings optionally containing hetero atoms can be condensed,
or a residue of formula (II) or (III)

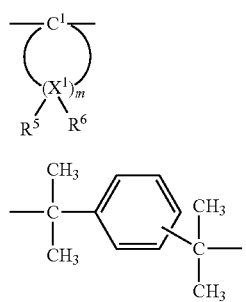

B in each case is $C_1$ to $C_{12}$ alkyl, preferably methyl, or halogen, preferably chlorine and/or bromine
x in each case independently of one another is 0, 1 or 2,
p is 1 or 0, and
$R^5$ and $R^6$ can be selected for each $X^1$ individually, and are, independently of one another, hydrogen or $C_1$ to $C_6$ alkyl, preferably hydrogen, methyl or ethyl,
$X^1$ is carbon and
m is an integer from 4 to 7, preferably 4 or 5, with the proviso that $R^5$ and $R^6$ are simultaneously alkyl on at least one atom $X^1$.

Preferred diphenols are hydroquinone, resorcinol, dihydroxydiphenols, bis(hydroxyphenyl) $C_1$-$C_5$ alkanes, bis(hydroxyphenyl) $C_5$-$C_6$ cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl) diisopropylbenzenes as well as the ring-brominated and/or ring-chlorinated derivates thereof.

Particularly preferred diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenylsulfide, 4,4'-dihydroxydiphenylsulfone and the di- and tetrabrominated or chlorinated derivatives thereof, such as e.g. 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. Particularly preferred is 2,2-bis(4-hydroxyphenyl)propane (bisphenol A).

The diphenols can be used individually or as any mixtures. The diphenols are known from the literature or obtainable by processes known from the literature.

Suitable chain terminators for the production of the thermoplastic, aromatic polycarbonates are, for example, phenol, p-chlorophenol, p-tert.-butylphenol or 2,4,6-tribromophenol, but also long-chain alkylphenols, such as 4-[2-(2,4,4-trimethylpentyl)]phenol, 4-(1,3-tetramethylbutyl)phenol according to DE-A 2 842 005 or monoalkylphenol or dialkyl-phenols with a total of 8 to 20 carbon atoms in the alkyl substituents, such as 3,5-di-tert.-butyl-phenol, p-isooctylphenol, p-tert.-octylphenol, p-dodecylphenol and 2-(3,5-dimethylheptyl) phenol and 4-(3,5-dimethylheptyl)phenol. The quantity of chain terminators to be used is generally between 0.5 mole %, and 10 mole %, based on the molar sum of the diphenols used in each case.

The thermoplastic, aromatic polycarbonates have average molecular weights (weight average $M_w$, measured by GPC (gel permeation chromatography) with polycarbonate standard) of 10,000 to 200,000 g/mol, preferably 15,000 to 80,000 g/mol, particularly preferably 24,000 to 32,000 g/mol.

The thermoplastic, aromatic polycarbonates can be branched in a known manner, preferably by incorporating 0.05 to 2.0 mole %, based on the sum of the diphenols used, of trifunctional or more than trifunctional compounds, for example those with three and more phenolic groups. Linear polycarbonates, more preferably based on bisphenol A, are preferably used.

Both homopolycarbonates and copolycarbonates are suitable. For the production of copolycarbonates according to the invention according to component A, 1 to 25 wt. %, preferably 2.5 to 25 wt. %, based on the total amount of diphenols to be used, of polydiorganosiloxanes with hydroxyaryloxy end groups can also be used. These are known (U.S. Pat. No. 3,419,634) and can be produced by processes known from the literature. Also suitable are polydiorganosiloxane-containing copolycarbonates; the production of the polydiorganosiloxane-containing copolycarbonates is described for example in DE-A 3 334 782.

Preferred polycarbonates are, in addition to the bisphenol A homopolycarbonates, the copolycarbonates of bisphenol A with up to 15 mole %, based on the molar sums of diphenols, of other diphenols mentioned as preferred or particularly preferred, especially 2,2-bis(3,5-dibromo-4-hydroxyphenyl) propane.

Aromatic dicarboxylic acid dihalides for the production of aromatic polyester carbonates are preferably the diacid dichlorides of isophthalic acid, terephthalic acid, diphenylether-4,4'-dicarboxylic acid and naphthalene-2,6-dicarboxylic acid.

Particularly preferred are mixtures of the diacid dichlorides of isophthalic acid and terephthalic acid in a ratio between 1:20 and 20:1.

In the production of polyester carbonates, a carbonic acid halide, preferably phosgene, is additionally incorporated as a bifunctional acid derivative.

As chain terminators for the production of the aromatic polyester carbonates, in addition to the already mentioned monophenols, their chlorocarbonates and the acid chlorides of aromatic monocarboxylic acids, which may optionally be substituted by $C_1$ to $C_{22}$ alkyl groups or by halogen atoms, as well as aliphatic $C_2$ to $C_{22}$ monocarboxylic acid chlorides are suitable.

The quantity of chain terminators is in each case 0.1 to 10 mole %, based in the case of phenolic chain terminators on moles of diphenol and in the case of monocarboxylic acid chloride chain terminators on moles of dicarboxylic acid dichloride.

In the production of aromatic polyester carbonates, one or more aromatic hydroxycarboxylic acids can additionally be used.

The aromatic polyester carbonates can be either linear or branched in a known manner (cf. DE-A 2 940 024 and DE-A 3 007 934), linear polyester carbonates being preferred.

As branching agents it is possible to use for example tri- or polyfunctional carboxylic acid chlorides, such as trimesic acid trichloride, cyanuric acid trichloride, 3,3'-,4,4'-benzophenonetetracarboxylic acid tetrachloride, 1,4,5,8-naphthalene tetracarboxylic acid tetrachloride or pyromellitic acid tetrachloride, in quantities of 0.01 to 1.0 mole % (based on dicarboxylic acid dichlorides used) or tri- or polyfunctional phenols, such as phloroglucinol, 4,6-dimethyl-2,4,6-tri-(4-hydroxyphenyl)-hept-2-ene, 4,6-dimethyl-2,4-6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl) phenylmethane, 2,2-bis[4,4-bis(4-hydroxyphenyl)cyclohexyl]propane, 2,4-bis(4-hydroxyphenylisopropyl)phenol, tetra-(4-hydroxyphenyl)methane, 2,6-bis(2-hydroxy-5-methyl-benzyl)-4-methylphenol, 2-(4-hydroxyphenyl)-2-(2,4-dihydroxyphenyl)propane, tetra-(4-[4-hydroxyphenylisopropyl]phenoxy)methane, 1,4-bis[4,4'-dihydroxytriphenyl) methyl]benzene, in quantities of 0.01 to 1.0 mole % based on diphenols used. Phenolic branching agents can be initially charged with the diphenols; acid chloride branching agents can be added together with the acid dichlorides.

In the thermoplastic, aromatic polyester carbonates, the proportion of carbonate structural units can be varied at will. The proportion of carbonate groups is preferably up to 100 mole %, particularly up to 80 mole %, particularly preferably up to 50 mole %, based on the sum of ester groups and carbonate groups. Both the ester and the carbonate portions of the aromatic polyester carbonates can be present in the polycondensate in the form of blocks or randomly distributed.

The thermoplastic, aromatic polycarbonates and polyester carbonates can be used individually or in any mixture.

Component B

Component B comprises one or more graft polymers of
B.1 5 to 95, preferably 20 to 90 wt. %, particularly preferably 30 to 60 wt. %, of at least one vinyl monomer on
B.2 95 to 5, preferably 80 to 10 wt. %, particularly preferably 70 to 40 wt. %, of one or more backbones with glass transition temperatures <10° C., preferably <0° C., particularly preferably <−20° C.

The backbone B.2 generally has an average particle size ($d_{50}$ value) of 0.05 to 10.00 μm, preferably 0.10 to 5.00 μm, more preferably 0.20 to 1.00 μm and particularly preferably of 0.25 to 0.50 μm.

Monomers B.1 are preferably mixtures of
B.1.1 50 to 99 parts by weight vinylaromatics and/or ring-substituted vinylaromatics (such as styrene, a-methylstyrene, p-methylstyrene, p-chlorostyrene) and/or (meth)acrylic acid ($C_1$-$C_8$) alkyl esters, such as methyl methacrylate, ethyl methacrylate), and
B.1.2 1 to 50 parts by weight vinylcyanides (unsaturated nitriles such as acrylonitrile and methacrylonitrile) and/or (meth)acrylic acid ($C_1$-$C_8$) alkyl esters, such as methyl methacrylate, n-butyl acrylate, t-butyl acrylate, and/or derivatives (such as anhydrides and imides) of unsaturated carboxylic acids, for example maleic anhydride.

Preferred monomers B.1.1 are selected from at least one of the monomers styrene, α-methylstyrene and methyl methacrylate; preferred monomers B.1.2 are selected from at least one of the monomers acrylonitrile, maleic anhydride and methyl methacrylate. Particularly preferred monomers are B.1.1 styrene and B.1.2 acrylonitrile.

Suitable backbones B.2 for the graft polymers B are for example diene rubbers, EP(D)M rubbers, i.e. those based on ethylene/propylene and optionally diene, polyacrylate, polyurethane, silicone, chloroprene and ethylene/vinyl acetate rubbers.

Preferred backbones B.2 are diene rubbers, for example based on butadiene and isoprene, or mixtures of diene rubbers or copolymers of diene rubbers or mixtures thereof with other copolymerisable monomers (e.g. according to B.1.1 and B.1.2), with the proviso that the glass transition temperature of component B.2 is below <10° C., preferably <0° C., particularly preferably <−10° C. Pure polybutadiene rubber is particularly preferred. The glass transition temperature is determined by differential scanning calorimetry (DSC) in accordance with DIN EN 61006 at a rate of heating of 10 K/min with determination of $T_g$ as a midpoint determination (tangent method).

Particularly preferred polymers B are for example ABS polymers (emulsion, bulk and suspension ABS), as described e.g. in DE-OS 2 035 390 (=U.S. Pat. No. 3,644,574) or in DE-OS 2 248 242 (=GB-PS 1 409 275) and in Ullmanns, Enzyklopädie der Technischen Chemie, vol. 19 (1980), pp. 280 ff. The gel content of the backbone B.2 is at least 30 wt. %, preferably at least 40 wt. % (measured in toluene).

The graft copolymers B are produced by free-radical polymerisation, e.g. by emulsion, suspension, solution or bulk polymerisation, preferably by emulsion or bulk polymerisation, particularly preferably by emulsion polymerisation.

Particularly suitable graft rubbers are also ABS polymers, which are produced in an emulsion polymerisation process by redox initiation with an initiator system comprising organic hydroperoxide and ascorbic acid according to U.S. Pat. No. 4,937,285.

Since, as is known, the graft monomers are not necessarily grafted on to the backbone completely during the graft reaction, the term graft polymers B according to the invention also includes those products which are obtained by (co)polymerisation of the graft monomers in the presence of the backbone and are obtained at the same time during work-up.

Suitable polyacrylate rubbers according to B.2 of the polymers B are preferably polymers of alkyl acrylates, optionally with up to 40 wt. %, based on B.2, of other polymerisable, ethylenically unsaturated monomers. The preferred polymerisable acrylates include $C_1$ to $C_8$ alkyl esters, for example methyl, ethyl, butyl, n-octyl and 2-ethylhexyl esters; haloalkyl esters, preferably halogen $C_1$-$C_8$ alkyl esters, such as chloroethyl acrylate and mixtures of these monomers.

For crosslinking purposes, monomers with more than one polymerisable double bond can be copolymerised. Preferred examples of crosslinking monomers are esters of unsaturated monocarboxylic acids with 3 to 8 C atoms and unsaturated monohydric alcohols with 3 to 12 C atoms, or saturated polyols with 2 to 4 OH groups and 2 to 20 C atoms, such as ethylene glycol dimethacrylate, allyl methacrylate; polyunsaturated heterocyclic compounds, such as trivinyl and triallyl cyanurate; polyfunctional vinyl compounds, such as di- and trivinylbenzenes; but also triallyl phosphate and diallyl phthalate. Preferred crosslinking monomers are allyl methacrylate, ethylene glycol dimethacrylate, diallyl phthalate and heterocyclic compounds which have at least three ethylenically unsaturated groups. Particularly preferred crosslinking monomers are the cyclic monomers triallyl cyanurate, triallyl isocyanurate, triacryloylhexahydro-s-triazine, triallyl benzenes. The quantity of crosslinked monomers is preferably 0.02 to 5.00, particularly 0.05 to 2.00 wt. %, based on the backbone B.2. In the case of cyclic crosslinking monomers with at least three ethylenically unsaturated groups it is advantageous to limit the quantity to less than 1 wt. % of the backbone B.2.

Preferred "other" polymerisable, ethylenically unsaturated monomers, which may optionally be used in addition to the acrylates for the production of the backbone B.2 are e.g. acrylonitrile, styrene, α-methylstyrene, acrylamide, vinyl $C_1$-$C_6$ alkyl ethers, methyl methacrylate, butadiene. Preferred polyacrylate rubbers as the backbone B.2 are emulsion polymers having a gel content of at least 60 wt. %.

Other suitable backbones according to B.2 are silicone rubbers with graft-active points, as described in DE-OS 3 704 657, DE-OS 3 704 655, DE-OS 3 631 540 and DE-OS 3 631 539.

The gel content of the backbone B.2 is determined at 25° C. in a suitable solvent (M. Hoffmann, H. Krömer, R. Kuhn, Polymeranalytik I and II, Georg Thieme-Verlag, Stuttgart 1977).

The average particle size $d_{50}$ is the diameter having 50 wt. % of the particles above and 50 wt. % below it. It can be determined by ultracentrifuge measurement (W. Scholtan, H. Lange, Kolloid, Z. and Z. Polymere 250 (1972), 782-1796).

Component C

Phosphorus-containing flame retardants C within the meaning according to the invention are preferably selected from the groups of the monomeric and oligomeric phosphoric and phosphonic acid esters, phosphonate amines and phosphazenes, with mixtures of several components selected from one or various of these groups also possibly being used as flame retardants. Other halogen-free phosphorus compounds not specifically mentioned here can also be used alone or in any combination with other halogen-free phosphorus compounds.

Preferred monomeric and oligomeric phosphoric and phosphonic acid esters are phosphorus compounds of the general formula (IV)

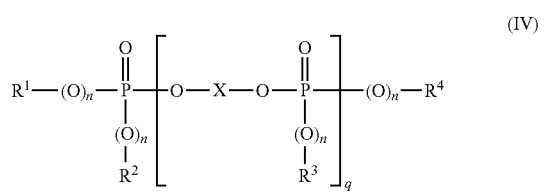

wherein $R^1$, $R^2$, $R^3$ and $R^4$, independently of one another, in each case signify optionally halogenated $C_1$ to $C_8$ alkyl, in each case optionally alkyl-substituted, preferably $C_1$ to $C_4$ alkyl-substituted, and/or halogen-substituted, preferably chlorine- or bromine-substituted, $C_5$ to $C_6$ cycloalkyl, $C_6$ to $C_{20}$ aryl or $C_7$ to $C_{12}$ aralkyl n independently of one another signifies 0 or 1, q signifies 0 to 30 and X signifies a mono- or polynuclear aromatic residue with 6 to 30 C atoms, or a linear or branched aliphatic residue with 2 to 30 C atoms, which can be OH-substituted and can contain up to 8 ether bonds.

Preferably $R^1$, $R^2$, $R^3$ and $R^4$ independently of one another denote $C_1$ to $C_4$ alkyl, phenyl, naphthyl or phenyl $C_1$-$C_4$ alkyl. The aromatic groups $R^1$, $R^2$, $R^3$ and $R^4$ can, in turn, be substituted with halogen and/or alkyl groups, preferably chlorine, bromine and/or $C_1$ to $C_4$ alkyl. Particularly preferred aryl residues are cresyl, phenyl, xylenyl, propyl phenyl or butyl phenyl as well as the corresponding brominated and chlorinated derivatives thereof.

X in formula (IV) preferably signifies a mono- or polynuclear aromatic residue with 6 to 30 C atoms. This is preferably derived from diphenols of formula (I).

n in formula (IV) can, independently of one another, be 0 or 1; n is preferably equal to 1.

q denotes whole numbers of 0 to 30, preferably 0 to 20, particularly preferably 0 to 10; in the case of mixtures it denotes average values of 0.8 to 5.0, preferably 1.0 to 3.0, more preferably 1.05 to 2.00 and particularly preferably from 1.08 to 1.60.

X particularly preferably denotes

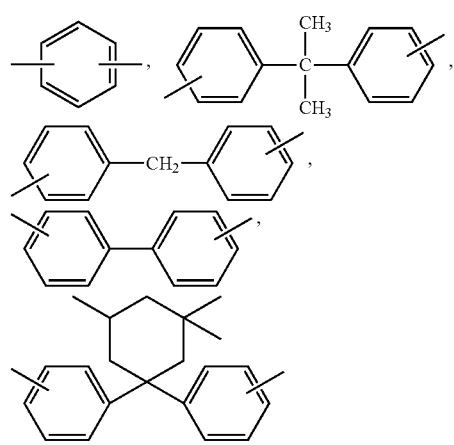

or the chlorinated or brominated derivatives thereof; X is derived in particular from resorcinol, hydroquinone, bisphenol A or diphenyl phenol. X is particularly preferably derived from bisphenol A.

Phosphorus compounds of formula (IV) are in particular tributyl phosphate, triphenyl phosphate, tricresyl phosphate, diphenylcresyl phosphate, diphenyloctyl phosphate, diphenyl-2-ethylcresyl phosphate, tri(isopropylphenyl) phosphate, resorcinol bridged oligophosphate and bisphenol A bridged oligophosphate. The use of oligomeric phosphoric acid esters of formula (IV) which are derived from bisphenol A, is particularly preferred.

Most particularly preferred as component C is bisphenol A-based oligophosphate according to formula (IVa).

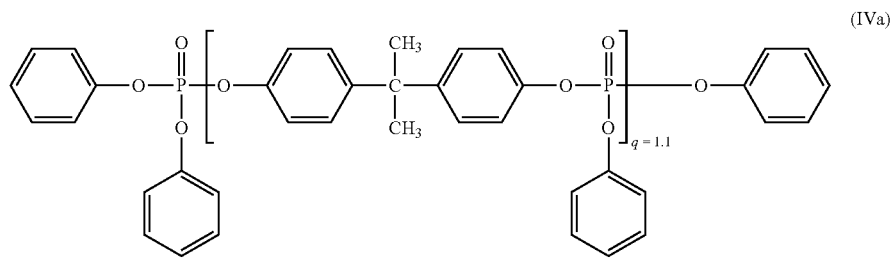

The phosphorus compounds according to component C are known (cf. e.g. EP-A 0 363 608, EP-A 0 640 655) or can be produced in a similar way by known methods (e.g. Ullmanns Enzyklopädie der technischen Chemie, vol. 18, pp. 301 ff. 1979; Houben-Weyl, Methoden der organischen Chemie, vol. 12/1, p. 43; Beilstein vol. 6, p. 177).

As component C according to the invention, it is also possible to use mixtures of phosphates with different chemical structures and/or with the same chemical structure and different molecular weights.

Mixtures with the same structure and different chain lengths are preferably used, the q value given being the average q value. The average q value can be determined by determining the composition of the phosphorus compound (molecular weight distribution) by means of a suitable method (gas chromatography (GC), high pressure liquid chromatography (HPLC), gel permeation chromatography (GPC)) and calculating the average values for q therefrom.

In addition, phosphonate amines and phosphazenes, as described in WO 00/00541 and WO 01/18105, can be used as flame retardants.

The flame retardants can be used individually or in any mixture with one another or in a mixture with other flame retardants.

Component D

A surface-treated, calcined kaolin is used as component D.

The main component of naturally occurring kaolin is kaolinite, $Al_2(OH)_4[Si_2O_5]$, and secondary components are feldspars, mica and quartz. In addition to this composition it is also possible to use kaolins which also contain nacrite, dickite, halloysite and hydrated halloysite instead of or in addition to kaolinite.

The calcined kaolin according to the invention is obtained by heat treatment of a kaolin at a minimum of 500° C., preferably from 850° C. to 1100° C. The hydroxyl groups that form part of the crystal structure of the kaolin are lost during this heat treatment and the kaolin is converted into calcined kaolin.

As a function of the calcining temperature, anhydrous aluminium silicates of different compositions and structures (e.g. Al2Si2O7, Si3Al4O12, Si2Al6O13) are obtained.

The average particle diameter (d50 value) of the kaolin used can be from 0.1 μm to 5.0 μm, preferably from 0.2 μm to 2.0 μm and particularly preferably preferably from 0.8 μm to 1.8 μm.

If the average particle diameter is less than 0.1 μm, no significant improvement to the impact resistance and surface hardness is achieved by the filler, while the use of a kaolin with an average particle diameter of more than 5.0 μm leads to surface defects and reduced toughness.

The average particle diameter ($d_{50}$ value) is determined by sedimentation in an aqueous medium using a Sedigraph 5100, Micrometrics Instruments Corporation, Norcross, Ga., USA.

The surface modification of the calcined kaolin can take place using an organic titanium or silane compound of the general formula (V)

$$R^1—(CH_2)_n\text{-M-}(X)_3 \qquad (V)$$

with M=Ti or Si;
$R^1$=H, alkyl, aryl, alkylaryl, alkenyl, cycloalkyl, vinyl, amino, mercapto, acetoxy, alkoxy, epoxy and (meth)acryloxy;
n=integer from 1-6; and
X=H, alkyl, aryl, alkylaryl, alkenyl, cycloalkyl, vinyl and/or $OR^2$ with $R^2$=H, alkyl, aryl, alkylaryl, alkenyl, cycloalkyl, vinyl and alkyl ether and alkyl polyether. Preferably M=Si. It is possible to use, for example, alkyl silanes, aryl silanes, epoxy silanes, aminosilanes such as e.g. γ-aminopropyl triethoxysilane, mercaptosilanes, alkoxysilanes, methacryloxy silanes such as e.g. γ-methacryloxypropyl trihydroxysilane, vinyl silanes or vinyl alkoxysilanes, such as e.g. vinyl triethoxysilane, vinyl methyl diethoxysilane or vinyl trimethoxysilane.

Preferred residues X, $R^1$ and $R^2$ are hydrogen, alkyl, aryl, alkylaryl, alkenyl, cycloalkyl or vinyl groups, which can be substituted or unsubstituted and optionally interrupted by hetero atoms. X, $R^1$ and $R^2$ here, in each case independently of one another, can be the same or different, with the X residues or $R^2$ residues preferably being the same.

Examples of hydrocarbon residues X, $R^1$ and $R^2$ are alkyl residues, such as for example methyl, ethyl, n-propyl, isopropyl, n-butyl, isobutyl, tert.-butyl, n-pentyl, isopentyl, neopentyl, tert.-pentyl residue, hexyl residues, such as for example n-hexyl residue, heptyl residues, such as for example n-heptyl residue, octyl residues, such as the n-octyl residue and isooctyl residues, such as for example 2,2,4-trimethylpentyl residue, nonyl residues, such as for example n-nonyl residue, decyl residues, such as for example n-decyl residue, dodecyl residues, such as for example n-dodecyl residue, octadecyl residues, such as for example n-octadecyl residue; cycloalkyl residues, such as for example cyclopentyl, cyclohexyl, cycloheptyl residues and methylcyclohexyl residues; aryl residues, such as for example phenyl, biphenyl, naphthyl and anthryl and phenanthryl residue; alkaryl residues, such as for example o-, m-, p-tolyl residues, xylyl residues and ethyl phenyl residues; aralkyl residues, such as for example benzyl residue, the α- and the β-phenylethyl residue.

Examples of substituted hydrocarbon residues X, $R^1$ and $R^2$ are halogenated alkyl residues, such as for example 3-chloropropyl, the 3,3,3-trifluorpropyl and the perfluorohexylethyl residue, halogenated aryl residues, such as e.g. p-chlorophenyl and the p-chlorobenzyl residue.

Other examples of residues X, $R^1$ and $R^2$ are the vinyl, allyl, methallyl, 1-propenyl, 1-butenyl, 1-pentenyl residue, 5-hexenyl, butadienyl, hexadienyl, cyclopentenyl, cyclopentadienyl, cyclohexenyl, ethinyl, propargyl and 1-propinyl residue.

The residue R1 is preferably vinyl or amino, particularly preferably vinyl.

In another preferred embodiment according to the invention, residue R2 is hydrogen, methyl or ethyl.

The silane or titanium compounds are used for surface treatment in quantities of 0.05 wt. % to 5.00 wt. %, preferably 0.50 wt. % to 2.00 wt. % and especially 0.80 to 1.50 wt. % based on the calcined kaolin.

The surface treatment agent can either be applied first on to the calcined kaolin, or can be metered in directly together with the untreated calcined kaolin.

Other Additives E

The composition can contain other conventional polymer additives such as flame retardant synergists, anti-drip agents (for example compounds of the classes of substances of the fluorinated polyolefins, silicones and aramid fibres), lubricants and mould release agents (for example pentaerythritol tetrastearate), nucleating agents, stabilisers, antistatic agents (for example conductive carbon blacks, carbon fibres, carbon nanotubes and organic antistatic agents such as polyalkylene ethers, alkyl sulfonates or polyamide-containing polymers) as well as dyes, pigments, fillers and reinforcing materials, especially glass fibres, mineral reinforcing materials and carbon fibres.

As anti-drip agents, in particular polytetrafluoroethylene (PTFE) or PTFE-containing compositions, such as for example masterbatches of PTFE with styrene- or methyl methacrylate-containing polymers or copolymers are used. As stabilisers, preferably sterically hindered phenols and phosphites or mixtures thereof are used, such as for example Irganox© B900 (Ciba Specialty Chemicals). Pentaerythritol tetrastearate is preferably used as mould release agent. In addition, a black pigment (e.g. Black Pearls) is preferably added.

Component F

Component F comprises one or more thermoplastic vinyl (co)polymers.

Suitable as vinyl (co)polymers F are polymers of at least one monomer from the group of the vinylaromatics, vinyl cyanides (unsaturated nitriles), (meth)acrylic acid ($C_1$-$C_8$) alkyl esters, unsaturated carboxylic acids and derivatives (such as anhydrides and imides) of unsaturated carboxylic acids. Particularly suitable are (co)polymers of F.1 50 to 99, preferably 60 to 80 parts by weight vinylaromatics and/or ring-substituted vinylaromatics such as styrene, α-methylstyrene, p-methylstyrene, p-chlorostyrene) and/or (meth)acrylic acid ($C_1$-$C_8$) alkyl esters, such as methyl methacrylate, ethyl methacrylate), and F.2 1 to 50, preferably 20 to 40 parts by weight vinyl cyanides (unsaturated nitriles) such as acrylonitrile and methacrylonitrile and/or (meth)acrylic acid ($C_1$-$C_8$) alkyl esters, such as methyl methacrylate, n-butyl acrylate, t-butyl acrylate, and/or unsaturated carboxylic acids, such as maleic acid, and/or derivatives, such as anhydrides and imides, of unsaturated carboxylic acids, for example maleic anhydride and N-phenylmaleimide).

The vinyl (co)polymers F are advantageously resinous, thermoplastic and rubber-free. The copolymer of F.1 styrene and F.2 acrylonitrile is particularly preferred.

The (co)polymers according to F are known and can be produced by free-radical polymerisation, in particular by emulsion, suspension, solution or bulk polymerisation. The (co)polymers preferably possess average molecular weights Mw (weight average, determined by light scattering or sedimentation) between 15,000 and 200,000 g/mol, particularly preferably between 100,000 and 150,000 g/mol.

In a particularly preferred embodiment, F is a copolymer of 77 wt. % styrene and 23 wt. % acrylonitrile with a weight average molecular weight $M_w$ of 130,000 g/mol.

The following non-limiting examples serve to explain the invention further.

Component A

Linear polycarbonate based on bisphenol A with a weight-average molecular weight $\bar{M}_w$ of 27500 g/mol (determined by GPC in dichloromethane with polycarbonate as standard).

Component B

ABS graft polymer, produced by emulsion polymerisation of 43 wt. %, based on the ABS polymer, of a mixture of 27 wt. % acrylonitrile and 73 wt. % styrene in the presence of 57 wt. %, based on the ABS polymer, of a particulate crosslinked polybutadiene rubber (average particle diameter $d_{50}$=0.35 μm).

Component C

Bisphenol A-based oligophosphate

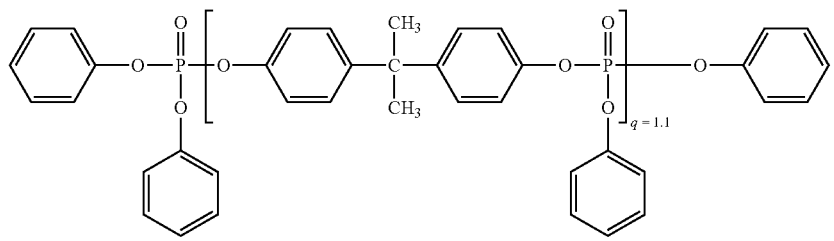

Component D 1

Calcined kaolin (aluminium silicate) with an average particle size of 1.5 μm

Component D 2

Vinyl silane-modified, calcined kaolin (aluminium silicate) with an average particle size of 1.5 μm Component E1

Polytetrafluoroethylene powder, CFP 6000 N, Du Pont

Component E2

Pentaerythritol tetrastearate as lubricant/mould release agent

Component E3

Phosphite stabiliser, Irganox® B 900, Ciba Specialty Chemicals

Component E4

Black pigment Black Pearls 800, Cabot

Production and testing of the moulding compositions

In a twin-screw extruder (ZSK-25) (Werner and Pfleiderer), the feed materials listed in Table 1 are compounded and granulated at a speed of 225 rpm and a throughput of 20 kg/h at a machine temperature of 260° C.

The finished granules are processed on an injection-moulding machine into the appropriate test pieces (melt temperature 260° C., tool temperature 80° C., flow front velocity 240 mm/s).

To characterise the properties of the materials, the following methods were used:

The IZOD impact resistance was measured in accordance with ISO 180/1U on specimens gated on one side with dimensions of 80 mm×10 mm×4 mm.

The modulus of elasticity in tension and the elongation at break were determined in accordance with ISO 527 on dumbbell specimens with a geometry of 170 mm×10 mm×4 mm.

The heat deflection temperature was measured in accordance with ISO 306 (Vicat softening point, process B with 50 N load and a heating rate of 120 K/h) on specimens gated on one side with dimensions of 80 mm×10 mm×4 mm.

The melt viscosity was determined in accordance with ISO 11443 on the granules.

The environmental stress cracking properties (ESC properties) were investigated on bars measuring 80 mm×10 mm×4 mm in accordance with ISO 4599. The test pieces were pre-stretched using a curved template (pre-stretch εx=2.4%) and stored in the test medium (toluene/isopropanol 60:40) at room temperature. The environmental stress cracking properties were evaluated by means of the time to failure.

The fire behaviour was measured in accordance with UL 94V on bars measuring 127 mm×12.7 mm×1.5 mm.

The scratch resistance was determined in accordance with ASTM D-3363 (weight 750 g) as pencil hardness on sheets with a geometry of 75 mm×60 mm×3 mm. In this test, pencils with hardnesses of 3H, 2H, H, F, HB, B, 2B and 3B (decreasing hardness) were passed over the surface with a specified pressure. The pencil hardness gives the hardest pencil with which no scratch can be detected on the surface.

It can be seen from Table 1 that the composition in Example 2 with the combination of polycarbonate, emulsion ABS, BDP and vinyl silane-modified calcined kaolin is capable of achieving an object according to the invention, i.e. gives a combination of good impact resistance, high modulus of elasticity, improved elongation at break, flowability and chemical resistance with good performance in the UL94V test and improved scratch resistance.

As such in some embodiments, using a surface-treated (i.e. vinyl silane modified) calcined kaolin can provide advantageous results. Other surface treatments are also feasible as would be known to one of skill in the art.

TABLE 1

Composition and properties of the moulding compositions

|   |   | 1 Cp. | 2 |
|---|---|---|---|
| Components (wt. %) | | | |
| A | % | 72.3 | 72.3 |
| B | % | 5 | 5 |
| C | % | 11.4 | 11.4 |
| D1 | % | 9.9 | |
| D2 | % | | 9.9 |
| E1 | % | 0.4 | 0.4 |

TABLE 1-continued

Composition and properties of the moulding compositions

|   |   | 1 Cp. | 2 |
|---|---|---|---|
| E2 | % | 0.2 | 0.2 |
| E3 | % | 0.1 | 0.1 |
| E4 | % | 0.7 | 0.7 |
| Properties | | | |
| Izod impact resistance/RT (ISO 180/1U) | kJ/m² | 7 × not broken; 3 × 185 | 7 × not broken; 3 × 196 |
| Modulus of elasticity in tension (ISO 527) | N/mm² | 3110 | 3137 |
| Elongation at break (ISO 527) | % | 26 | 31 |
| Vicat B 120 (ISO 306) | ° C. | 106 | 106 |
| Melt viscosity 260° C. [100 s⁻¹] (ISO 11443) | Pas | 620 | 609 |
| Melt viscosity 260° C. [1000 s⁻¹] (ISO 11443) | Pas | 322 | 308 |
| Melt viscosity 260° C. [1500 s⁻¹] (ISO 11443) | Pas | 261 | 251 |
| ESC test against toluene:isopropanol 60:40 (ISO 4599), exposure with 2.4% outer fibre strain; time to failure | min:sec | 04:21 | 05:08 |
| UL 94 V (d = 1.5 mm): classification | | V-0 | V-0 |
| UL 94 V (d = 1.5 mm): total after-flame time | s | 12 | 11 |
| Scratch resistance: pencil hardness (ASTM D 3363) | stage | F | H |

The invention claimed is:

1. A composition comprising
   A) 10-90 parts by weight aromatic polycarbonate and/or aromatic polyester carbonate,
   B) 0.5-30 parts by weight rubber-modified graft polymer,
   C) 0.5-20 parts by weight of at least one phosphorus-containing flame retardant,
   D) 0.1-25.0 parts by weight surface-treated, calcined kaolin,
   E) 0-10 parts by weight of at least one other additive,
   F) 0-40 parts by weight vinyl (co)polymer (C.1)
   wherein said parts by weight are standardised such that the sum of the parts by weight of all components A+B+C+D+E+F in the composition adds up to 100,
   wherein the average particle diameter (d₅₀ value) of the kaolin used is from 0.1 μm to 5.0 μm, and
   wherein the surface of the calcined kaolin is modified by an organic titanium or silane compound of formula (V)

$$R^1-(CH_2)_n-M-(X)_3 \qquad (V)$$

with M=Ti or Si;
   R¹=H, alkyl, aryl, alkylaryl, alkenyl, cycloalkyl, vinyl, amino, mercapto, acetoxy, alkoxy, epoxy and (meth)acryloxy;
   n=integer from 1-6; and
   X=selected from the group consisting of H, alkyl, aryl, alkylaryl, alkenyl, cycloalkyl, vinyl and OR² with R²=H, alkyl, aryl, alkylaryl, alkenyl, cycloalkyl, vinyl and alkyl ether and alkyl polyether.

2. Compositions according to claim 1, characterised in that M=Si and R¹=vinyl.

3. A composition according to claim 1, wherein R² is selected from the group consisting of methyl, ethyl and hydrogen.

4. A composition according to claim 1, wherein the silane and/or titanium compound is used for surface treatment in a quantity of 0.05 wt. % to 5.00 wt. %, based on the weight of the calcined kaolin.

5. A composition according to claim 1, wherein the thermoplastic, aromatic polycarbonate has an average molecular weight (weight average) of 10,000 to 200,000 g/mol.

6. A composition according to claim 1, wherein the backbone of component B has an average particle size ($d_{50}$ value) of 0.05 to 10.00 μm.

7. A composition according to claim 1, wherein the backbone of component B is selected from the group consisting of diene rubbers, EP(D)M rubbers, polyacrylate, polyurethane, silicone, chloroprene and ethylene/vinyl acetate rubbers.

8. A composition according to claim 1, wherein the graft polymer (B) is built up from
B.1) 43 wt. % of an emulsion polymer of 27 wt. % acrylonitrile and 73 wt. % styrene, on
B.2) 57 wt. % of a particulate crosslinked polybutadiene rubber with an average particle diameter $d_{50}$ of 0.35 μm.

9. A composition according to claim 1, wherein the phosphorus-containing flame retardant (C) is a flame retardant of formula (IV)

$$R^1-(O)_n-\underset{\underset{R^2}{|}}{\underset{(O)_n}{|}}P-\left[O-X-O-\underset{\underset{R^3}{|}}{\underset{(O)_n}{|}}P\right]_q-(O)_n-R^4 \qquad (IV)$$

wherein
$R^1$, $R^2$, $R^3$ and $R^4$, independently of one another in each case signify optionally halogenated $C_1$ to $C_8$ alkyl, in each case optionally alkyl-substituted, and/or halogen-substituted, $C_5$ to $C_6$ cycloalkyl, $C_6$ to $C_{20}$ aryl or $C_7$ to $C_{12}$ aralkyl,
n independently of one another signifies 0 or 1
q is 0.80 to 5.00
X signifies a mono- or polynuclear aromatic residue with 6 to 30 C atoms, or a linear or branched aliphatic residue with 2 to 30 C atoms, which can be OH-substituted and can contain up to 8 ether bonds.

10. A composition according to claim 1, wherein component E is present and comprises at least one additive selected from the group consisting of flame retardant synergists, anti-drip agents, lubricants and mould release agents, nucleating agents, stabilisers, antistatic agents, dyes, pigments and fillers and reinforcing materials.

11. An injection-moulded and/or thermoformed mouldings prepared from a composition according to claim 1.

12. A composition according to claim 1, comprising 7.0-13.0 parts by weight of the surface-treated, calcined kaolin (D).

13. A composition according to claim 1, comprising
A) 60-75 parts by weight aromatic polycarbonate and/or aromatic polyester carbonate,
B) 4.0-9.0 parts by weight rubber-modified graft polymer,
C) 3.0-15.5 parts by weight of at least one phosphorus-containing flame retardant,
D) 8.0-12.0 parts by weight surface-treated, calcined kaolin,
E) 1.0-6.0 parts by weight of at least one other additive,
F) 1.5-10.0 parts by weight vinyl (co)polymer (C.1).

14. Compositions according to claim 1, wherein the average particle diameter ($d_{50}$ value) of the kaolin used is from 0.8 μm to 1.8 μm.

15. A composition consisting of
A) 10-90 parts by weight aromatic polycarbonate and/or aromatic polyester carbonate,
B) 0.5-30 parts by weight rubber-modified graft polymer,
C) 0.5-20 parts by weight of at least one phosphorus-containing flame retardant,
D) 0.1-25.0 parts by weight surface-treated, calcined kaolin,
E) 0-10 parts by weight of at least one other additive,
F) 0-40 parts by weight vinyl (co)polymer (C.1)
wherein said parts by weight are standardised such that the sum of the parts by weight of all components A+B+C+D+E+F in the composition adds up to 100, and wherein the surface of the calcined kaolin is modified by an organic titanium or silane compound of formula (V)

$$R^1-(CH_2)_n-M-(X)_3 \qquad (V)$$

with M=Ti or Si;
$R^1$=H, alkyl, aryl, alkylaryl, alkenyl, cycloalkyl, vinyl, amino, mercapto, acetoxy, alkoxy, epoxy and (meth) acryloxy;
n=integer from 1-6; and
X=selected from the group consisting of H, alkyl, aryl, alkylaryl, alkenyl, cycloalkyl, vinyl and $OR^2$ with $R^2$=H, alkyl, aryl, alkylaryl, alkenyl, cycloalkyl, vinyl and alkyl ether and alkyl polyether.

16. A composition consisting essentially of
A) 10-90 parts by weight aromatic polycarbonate and/or aromatic polyester carbonate,
B) 0.5-30 parts by weight rubber-modified graft polymer,
C) 0.5-20 parts by weight of at least one phosphorus-containing flame retardant,
D) 0.1-25.0 parts by weight surface-treated, calcined kaolin,
E) 0-10 parts by weight of at least one other additive,
F) 0-40 parts by weight vinyl (co)polymer (C.1)
wherein said parts by weight are standardised such that the sum of the parts by weight of all components A+B+C+D+E+F in the composition adds up to 100, wherein the graft polymer (B) is built up from
B.1) 43 wt. % of an emulsion polymer of 27 wt. % acrylonitrile and 73 wt. % styrene, on
B.2) 57 wt. % of a particulate crosslinked polybutadiene rubber with an average particle diameter $d_{50}$ of 0.35 μm and
wherein the surface of the calcined kaolin is modified by an organic titanium or silane compound of formula (V)

$$R^1-(CH_2)_n-M-(X)_2 \qquad (V)$$

with M=Ti or Si;
$R^1$=H, alkyl, aryl, alkylaryl, alkenyl, cycloalkyl, vinyl, amino, mercapto, acetoxy, alkoxy, epoxy and (meth) acryloxy;
n=integer from 1-6; and
X=selected from the group consisting of H, alkyl, aryl, alkylaryl, alkenyl, cycloalkyl, vinyl and $OR^2$ with $R^2$=H, alkyl, aryl, alkylaryl, alkenyl, cycloalkyl, vinyl and alkyl ether and alkyl polyether.

17. A composition according to claim 15, consisting of
A) 60-75 parts by weight aromatic polycarbonate and/or aromatic polyester carbonate,
B) 4.0-9.0 parts by weight rubber-modified graft polymer,
C) 3.0-15.5 parts by weight of at least one phosphorus-containing flame retardant,
D) 8.0-12.0 parts by weight surface-treated, calcined kaolin,
E) 1.0-6.0 parts by weight of at least one other additive,
F) 1.5-10.0 parts by weight vinyl (co)polymer (C.1).

18. A composition according to claim 1, wherein M=Ti.

19. A composition according to claim 1, wherein M=Si.

* * * * *